United States Patent [19]

Izushi et al.

[11] Patent Number: 4,994,919
[45] Date of Patent: Feb. 19, 1991

[54] CAMERA FOR RECORDING TELEVISION, PHOTOGRAPHIC OR CINEMATOGRAPHIC IMAGES, INCLUDING AN AUTOMATIC FOCUS-SETTING DEVICE

[75] Inventors: Munehisa Izushi, Osaka, Japan; Cornelis A. M. Jaspers, Eindhoven, Netherlands

[73] Assignee: U.S. Philips Corp., New York, N.Y.

[21] Appl. No.: 15,420

[22] Filed: Feb. 17, 1987

[30] Foreign Application Priority Data

Feb. 17, 1986 [NL] Netherlands ............... 8600392

[51] Int. Cl.$^5$ .................................. H04N 5/232
[52] U.S. Cl. ................................ 358/227; 354/404
[58] Field of Search ............... 358/227; 354/400, 402, 354/404

[56] References Cited

U.S. PATENT DOCUMENTS

| | | | |
|---|---|---|---|
| 2,524,807 | 10/1950 | Kallmann | 358/227 |
| 2,838,600 | 6/1958 | Salinger | 358/227 |
| 2,964,590 | 12/1960 | Gillette | 358/227 |
| 2,999,436 | 9/1961 | Faulhaber | 354/404 |
| 3,398,665 | 8/1968 | John, Jr. et al. | 354/404 |
| 3,450,018 | 6/1969 | John, Jr. | 354/404 |
| 3,824,337 | 7/1974 | Sangster et al. | |
| 3,904,869 | 9/1975 | Stauffer | 354/404 |
| 4,301,478 | 11/1981 | Sakane et al. | |
| 4,414,575 | 11/1983 | Yamamoto et al. | 358/227 |
| 4,484,806 | 11/1984 | Onishi et al. | 358/227 |
| 4,668,991 | 5/1987 | Theuwissen et al. | 358/227 |
| 4,684,995 | 8/1987 | Baumeister | 358/227 |

Primary Examiner—Russell E. Adams
Attorney, Agent, or Firm—William L. Botjer

[57] ABSTRACT

A camera for recording television, photographic or cinematographic images includes an automatic focus-setting device. Information for this device is obtained with the aid of two optical paths having different path lengths present in an optical lens system placed in front of an opto-electronic sensor in the form of a charge transfer device comprising a pick-up member, a storage member and a shift register member. After a signal comparison of signals obtained during focus information recording periods the focus is set until an optimum signal correlation is the result. To realize a camera with both an undisturbed scene recording as an automatic focusing while using one and the same sensor for this purpose it operates consecutively during a television field period (TV) with a scene recording period (TVS), a scene information transfer period (TFV) for the transfer of information between the pick-up member and the storage member, at least one focus information recording period (TAS or TBS, respectively), the first and second optical paths being present in the optical lens system and a focus information transfer period (TFA or TFB, respectively) for the transfer of information between the pick-up member and the storage member.

6 Claims, 3 Drawing Sheets

| | M | | | |
|---|---|---|---|---|
| | ├t4 | ├t6 | ├t7/t7' | ├t(VS 294) |
| L1 | VS 1 | VS 79 | VS 87 | |
| L2 | VS 2 | VS 80 | VS 88 | |
| L77 | | | | |
| L78 | | | | |
| L79 | | | | AS1/BS1 |
| L80 | | | | AS2/BS2 |
| L85 | | | | AS7/BS7 |
| L86 | | | | AS8/BS8 |
| L87 | | | | |
| L88 | | | | |
| L207 | | | VS 293 | |
| L208 | | | VS 294 | |
| L209 | | | | |
| L210 | | | | |
| L215 | | VS 293 | | |
| L216 | | VS 294 | | |
| L217 | | | | |
| L218 | | | | |
| L285 | | | | |
| L286 | | | | |
| L287 | | | AS1/BS1 | |
| L288 | | | AS2/BS2 | |
| L293 | VS 293 | | AS7/BS7 | |
| L294 | VS 294 | | AS8/BS8 | |

CAMERA FOR RECORDING TELEVISION, PHOTOGRAPHIC OR CINEMATOGRAPHIC IMAGES, INCLUDING AN AUTOMATIC FOCUS-SETTING DEVICE

BACKGROUND OF THE INVENTION

The invention relates to a camera for recording television, photographic or cinematographic images, including an automatic focus-setting device, in which camera an image of a scene to be picked up is obtained via an optical lens system of an opto-electronic sensor in the form of a charge transfer device suitable for television comprising a pick-up member, an information storage member and a parallel-in, series-out shift register member connected to a sensor output terminal, said camera operating for the automatic focus-setting with first and second optical paths of different path lengths in the optical lens system, said camera including a signal comparator for comparing signals to be supplied by the sensor from the output terminal, which signals are associated with the presence of the first and second optical paths of different path lengths, the focus-setting device adjusting the focus-setting in a substantially optimum manner dependent on the result of comparison.

A camera of this type, particularly for use in television is described in U.S. Pat. No. 4,301,478. FIG. 10 of the Patent shows an embodiment of the charge transfer device in the form of a so-called frame transfer device and FIG. 11 shows an associated embodiment of the signal comparator. The Figures show that on a specific part of the scene sensor, outside the part on which the scene image is present for the conversion into a picture signal for display, two scene images are made via the optical paths of different path lengths. To this end the optical lens system comprises a prism having a semi-transmissive surface area and a fully reflective surface area. The singly passed light and the twice reflected light originate from the optical path having the shortest and longest path lengths, respectively. In the signal comparator the picture definition of one scene image is compared with that of the other for focus-setting, whilst the focus-setting is modified to obtain an optimum signal correlation. Furthermore the Patent describes that the different optical path lengths may be consecutively present in time. To this end the use of a disc rotating around a shaft and having the form a half a circle sector and consisting of transparent glass or a synthetic material is described, which disc rotates in front of the specific pick-up member which is used for obtaining the information for the focus-setting.

SUMMARY OF THE INVENTION

It is an object of the invention to realize a camera with automatic focusing in which the sensor is completely utilized for the scene recording and in which no specific part of the sensor is used for obtaining the focus-setting information. The normal scene sensor is then also utilized for the automatic focusing without the scene recording being disturbed. To this end a camera according to the invention is characterized in that during a television field period the camera is consecutively operative with a scene recording period, a scene information transfer period for the transfer of information between the pick-up member and the storage member, at least one focus information recording period in which the first or second optical paths, respectively, are present in the optical lens system, and a focus information transfer period for the transfer of information between the pick-up member and the storage member.

The invention is based on the recognition that it is not necessary to intend a specific pick-up member for recording the focus-setting information if the described sequence for recording and transferring the information is used, because the focus-setting information can then be introduced in the gradually emptied information storage member of the sensor.

A further camera according to the invention is characterized in that during a television field period the camera is consecutively operative with a scene recording period, a scene information transfer period for the transfer of information between the pick-up member and the storage member, a first focus information recording period in which the first optical path is present in the optical lens system, a first focus information transfer period for the transfer of information between the pick-up member and the storage member, a second focus information recording period in which the second optical path is present in the optical lens system and a second focus information transfer period for the transfer of information between the pick-up member and the storage member.

During the focus information transfer periods a desired information addition may be realized in a simple manner in the case of a desired short-lasting focus information recording period in an embodiment of a camera which is characterized in that in the camera having a time signal generator for applying distinct clock pulses a various outputs for the information transfer in and between the parts of the sensor the pick-up member and the storage member are coupled to distinct clock pulse outputs during the focus information transfer period, the frequency of the clock pulses for the information transfer in the pick-up member being a factor of an integer of more than one higher than that in the storage member, and the information between the pick-up member and the storage member being transferred under the control of the clock pulses for the information transfer in the storage member.

An embodiment of a camera in which the signal is applied to the signal comparator without influencing the signals corresponding to the scene is characterized in that the sensor output terminal is coupled to an input of a change-over device having a first and a second output, the first output being coupled to a signal terminal of the camera and the second output being coupled to an input of the signal comparator in the camera, the first and second outputs in the change-over device being connected to the input during television field scan periods and substantially during field blanking periods, respectively.

An embodiment of a camera in which a shutter rotatable about a shaft forms part of the optical lens system, which shutter provides the first and second optical paths of different path lengths in the system is characterized in that the shutter which is rotatable in front of the entire pick-up member of the sensor is formed with light-transmissive shutter areas with a shutter thickness present in front of the pick-up member during the scene recording periods, which thickness is smaller and larger, respectively, than the shutter thickness present in front of the pick-up member during two consecutive focus information recording periods.

To obtain an optimum focus-setting information a further camera embodiment is characterized in that the shutter has shutter areas which are opaque and are present in front of the pick-up member during at least one focus information transfer periods.

BRIEF DESCRIPTION OF THE DRAWINGS

The invention will be described in greater detail by way of example with reference to the accompanying drawing in which.

DETAILED DESCRIPTION OF THE PREFERRED EMBODIMENTS

Figure 1:
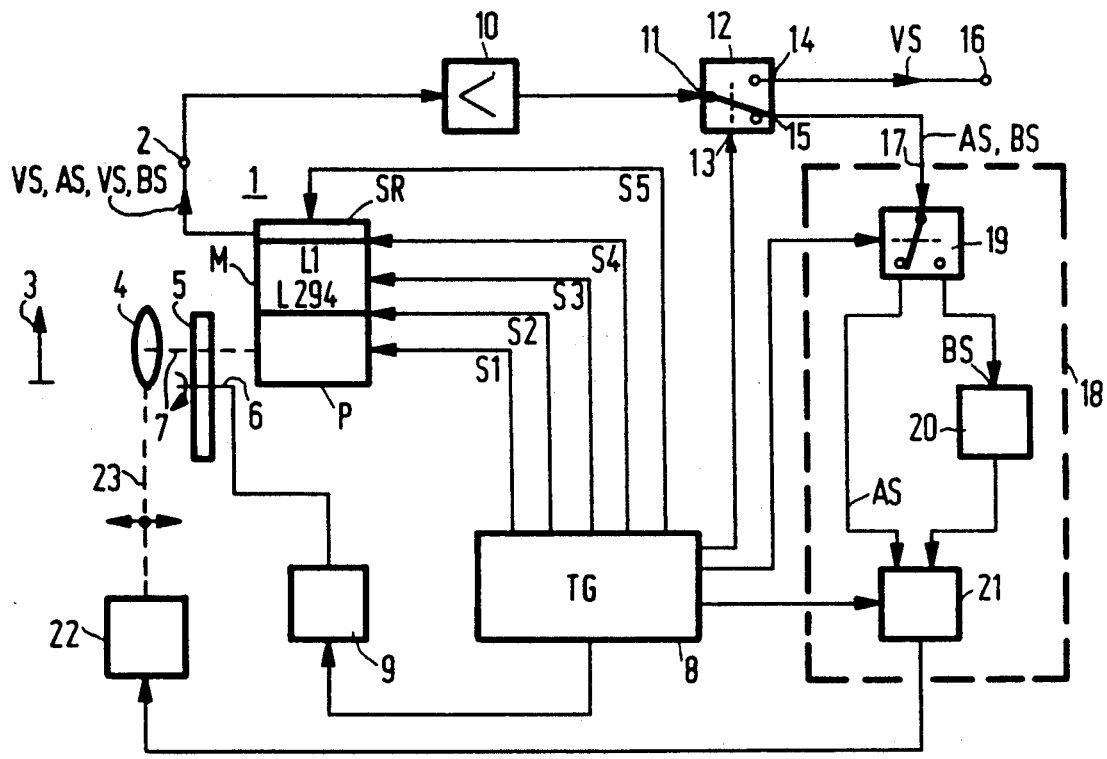
FIG. 1 is a block diagram of an embodiment of a camera according to the invention.

In the camera according to the invention which is shown in a block diagram in FIG. 1 the reference numeral 1 denotes an opto-electronic sensor which, as is illustrated by means of a block diagram, is in the form of a charge transfer device, more specifically as what is commonly referred to as a frame transfer device. The sensor 1 is in the form of an integrated circuit comprising a pick-up member P, an adjacent information storage member M which is shielded from light and, adjacent thereto, a parallel-in, series-out shift register member SR which is also shielded from light. The construction and the operation under the control of clock pulse signals to be applied is described in detail in U.S. Pat. No. 3,824,337 which is included herein by reference. The pick-up member P and the storage member M are constructed from pick-up and storage elements, respectively, which are arranged in rows and columns, a charge transfer occurring periodically in the column direction in the members P and M and between them. In FIG. 1, L1 ... L294 in the storage member M denotes that it is assumed to comprise 294 rows of storage elements, which corresponds to 294 television lines. The pick-up member P is also of a construction having 294 rows of pick-up elements. Instead of providing the row of storage elements L1 in the storage member M, it is alternatively possible to use the shift register member SR for that purpose, as described in said Patent. The shift register member SR may have several shift registers in combination with colour strip filters in front of the pick-up member P.

Instead of the described construction of the sensor 1 with the adjacent members P, M and SR, a storage member M arranged in the integrated circuit under the pick-up member P may be used. In this situation it should be ensured that light incident on the pick-up member P does not reach the storage member M and the shift register member SR. The charge transfer from the pick-up member P to the storage member M can now be effected directly from each pick-up element to the subjacent storage element, whereafter the charge transfer can be effected in the column direction in the storage member M to the shift register member SR. It should be noted that no charge transfer between the pick-up elements in the column direction is required. In the case in which this feature is indeed present, it will become apparent from the further course of this description that such a situation has its advantages.

A further example of a construction of the sensor 1 is that in which the shift register SR is in the form of the base of a comb which is selected from light and whose teeth constitute the storage member M. The pick-up elements of the pick-up member P are arranged in columns between the teeth of the storage member M. In this example the pick-up elements may also have a direct charge transfer to the adjacent, associated storage elements. A sensor having such a construction is referred to as an interline transfer device. If also here it is possible to transfer charge between the pick-up elements of the columns of the pick-up member P, this will have apparent advantages.

For simplicity of the description of the camera shown in FIG. 1, the description will be based on the construction of the sensor 1 in the form of the frame transfer device shown. To control the sensor 1 it receives clock pulse signals denoted by S1, S2 to S5, which causes an output terminal 2 of the sensor 1, which is coupled to the output of the shift register member SR, to carry a periodical signal sequence VS, AS, VS, BS shown next to it by way of example. For the sake of simplicity supply voltages for the sensor 1 and for further components in the camera of FIG. 1 are not shown. The signal VS will be found to be associated with a scene information to be displayed, the signals AS and BS being associated with a first and a second focus-setting information, respectively. The scene information in the signal VS to be displayed originates from a scene which is shown as an arrow and is denoted by 3. Light coming from the scene 3 is projected onto the pick-up member P of the sensor 1 via an optical lens system (4, 5) which for the sake of simplicity is shown as a single lens 4 and a disc shutter 5. The shutter 5 is in the form of, for example, a shutter disc rotating about a shaft 6. The central axis of the optical path of the lens system (4, 5) is denoted by 7.

Figure 4:
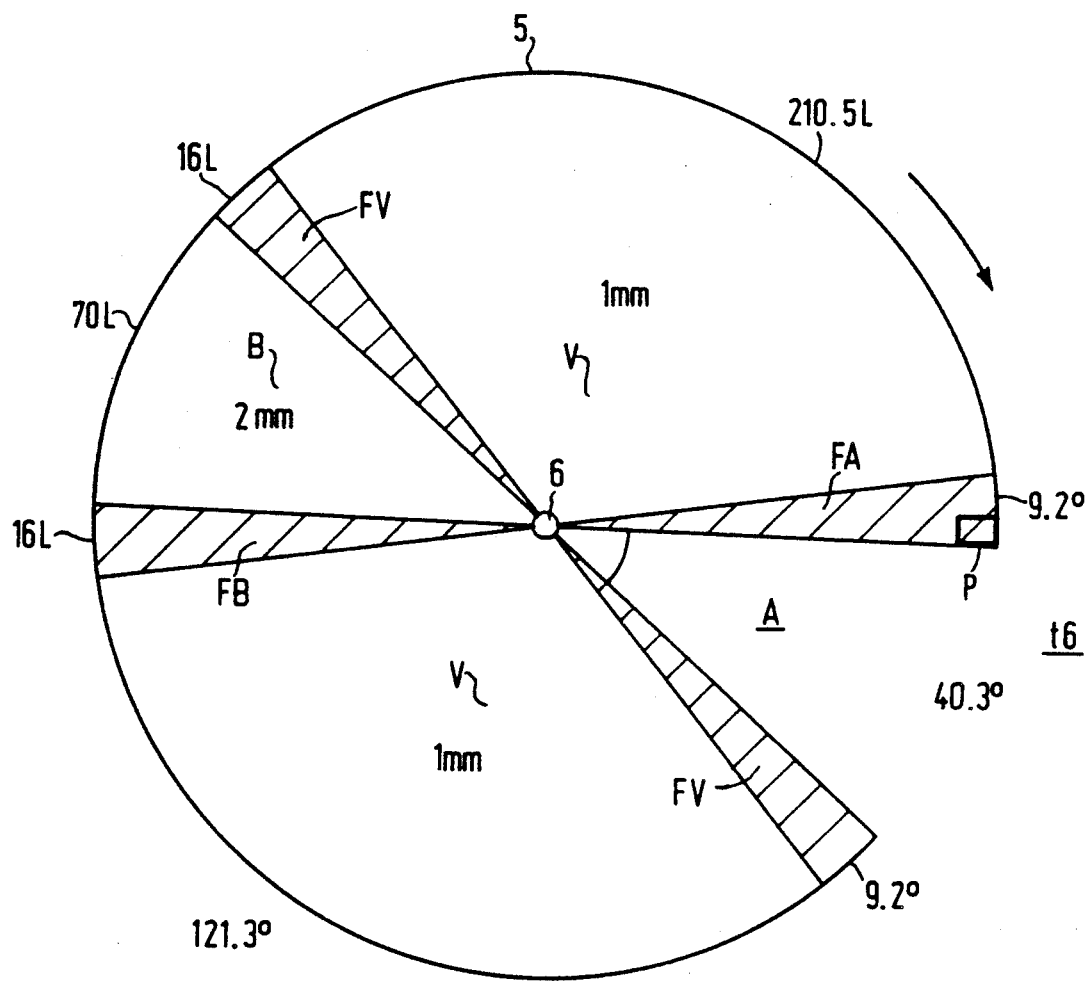
FIG. 4 shows by way of example an embodiment associated with the diagram of FIG. 2 of a shutter forming part of the optical lens system in the form of a shutter disc.

FIG. 4 shows a detailed embodiment of the shutter disc 5. According to FIG. 4 the circular shutter disc 5 has a cut-out sector A (that is to say, a disc thickness of zero), a sector B having a disc thickness of, for example, 2 mm, two wider sectors V having a disc thickness of, for example, 1 mm, which sectors B and V of transparent material are light-transmissive and four narrow opaque sectors FV, FA, FV and FB. The shutter 5 provides via the sectors A and B two optical paths in the optical lens system (4, 5) of different path lengths (0 and 2 mm disc thickness, respectively), the shutter thickness of the sector V (1 mm) being larger and smaller than that of the sectors A and B, respectively. The construction described with reference to FIG. 4 is associated with the time diagram of FIG. 2 in which periods in which a relevant sector V, FV, A, FA, V, FB moves in front of the pick-up member P in the optical path with the central axis 7 are denoted by TVS, TFV, TAS, TFA, TBS and TFB.

In the embodiment of the shutter disc 5 with a diameter of 124 mm shown by way of example in FIG. 4, several arc lengths of the sectors have been shown such as arc length of the sector V=121.3°, FV (=FA=FB)=9.2° and A (=B)=40.3°. In a manner to be described with reference to FIG. 2 these arc lengths of the rotary disc shutter 5 correspond to numbers of television lines denoted by 210.5 L, 16 L and 70 L, respectively.

In FIG. 4 the disc shutter 5 which is rotatable in the direction of the arrow is shown in a given position relative to the sensor 1 of FIG. 1, for which purpose the pick-up member P thereof is shown in FIG. 4. The dimensions of the pick-up member P are 4.5×6 mm.

When a scene is recorded the light originating from the scene 3 results in a scene forming an image on the pick-up member P of the sensor 1. During a scene recording period the photons of the incident light produce an electric charge integration in each of the pick-up elements in the pick-up member P. The recording period is identical to a light integration period. To process the scene information obtained by integration or accumulation in the pick-up member P, the clock pulse signals S1 to S5 are supplied by a time signal generator (TG) denoted by 8. For a detailed structure of the various clock pulse signals reference is made to the last-mentioned Patent. To emphasize a control of the sensor 1 in a form specific for one aspect of the present invention, the clock pulse signals for the control of the charge transfer in the members P, M and SR (signals S1, S3 and S5) and between the members P and M, M and SR (signals S2, S4) are shown separately.

In addition to the clock pulse signals S1 to S5, the time signal generator 8 applies further control signals, which are not further denoted by reference numerals, to other components in the camera of FIG. 1. The generator 8 applies a control signal to a control device 9 through which the shutter 5 is controlled. The shutter 5 is active in a synchronized manner with the sensor 1 via the generator 8.

The sensor output terminal 2 with the signal sequence VS, AS, VS, BS is connected, for example, via a preamplifier 10 to an input 11 of a change-over device 12. Further amplifiers and other signal processing circuits present in the camera have been omitted for the sake of simplicity. The generator 8 applies a control signal to a control input 13 of the device 12 so that a first output 14 thereof supplies the signal VS and a second output 15 supplies the signal sequence AS, BS. The signal VS representing the scene information to be displayed is applied to an output terminal 16 of the camera in FIG. 1. In the case in which the signal VS, after having been submitted to further signal processing operations which are customary for television, is used for television display, the camera shown in FIG. 1 operates as a television camera. Another possibility is to process the signal VS into a signal suitable for cinematographic reproduction so that the camera shown in FIG. 1 forms part of a cinefilm camera as a pick-up member. A further possibility is to process the signal VS to form a photograph or a slide so that the camera of FIG. 1 forms part of a photographic camera as its pick-up member. Independent of the specific camera construction, the camera shown in FIG. 1 may operate for black-white or colour television. In the case of colour television a plurality of sensors 1 may be present or a colour strip filter may be provided on the pick-up member P, whilst the shift register member SR may comprise several shift registers.

The output 15 of the change-over device 12 with the signal sequence AS, BS is coupled to an input 17 of a signal comparator 18. The comparator 18 includes a change-over device 19 having two outputs which are coupled directly and through a delay device 20, respectively, two inputs of a signal comparator 21. The generator 8 applies a control signal to the change-over device 19 so that from the signal sequence AS, BS, for example, the signal BS is applied to the delay device 20 and the signal AS is applied to the signal comparator 21.

The original field-sequence signals AS and BS are compared as simultaneous signals in the signal comparator 21. The signal comparator 21 may comprise several television field memories so that the signal comparison can be effected over a number of television field periods. The result of comparison, which is dependent on the comparison of the contrast or, in other words, the picture definition, is supplied by the comparator 21 under the control of the generator 8 to a focus-setting device 22 having a coupling 23 with the lens system 4. Dependent on the result of comparison the device 22 changes the focus setting in the lens system 4 until an over-or under-focusing changes into the substantially optimum focusing. The control has been shown diagrammatically in FIG. 1 with two oppositely directed arrows at the coupling 23 between the lens system 4 and the device 22.

The camera shown in FIG. 1 operates in known manner with the signal comparator 18 and the focus-setting device 22 which together constitute an automatic focus-setting device (18, 22) for the lens system (4, 5). According to the invention a camera in which without any mutual influence both a normal scene recording and an automatic focusing is obtained is realized in the case of a given manner of operation of the shutter 5 and the use of the described charge transfer device as the sensor 1.

Figure 2:
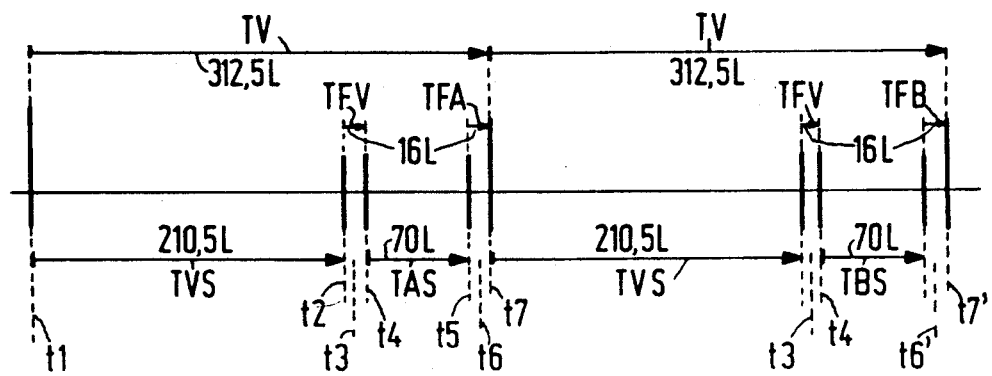
FIG. 2 shows a diagram as a function of time to illustrate the invention, FIG. 3 gives a survey as a function of time of the information processing in the storage member of the opto-electronic sensor to explain the operation of the camera according to FIG. 1.

The time diagram shown in FIG. 2 by way of illustration of the invention represents a cycle for the operation of the camera of FIG. 1. In the time diagram two television field periods are denoted by TV. It has been indicated that TV=312.5 L, which implies that a number 312.5 television lies occurs in the field period. It is assumed that the camera shown in FIG. 1 operates in accordance with a television system having a single interlaced 625-line standard for which TV=20 ms at a field frequency of 50 Hz. For the 525-line standard TV=262.5 L and TV=16.683 ms at a field frequency of 59.94 Hz. For the television lines L a line period follows which is equal to 64 and 63.556 $\mu$s and a line frequency of 16525 and 15734 Hz, respectively. Instead of the described interlaced television standards a deviating non-interlaced television system could likewise be used.

The time diagram of FIG. 2 is shown with a number of specific successive periods. These periods need not to be contiguous. The first period in the time diagram is denoted by TVS which is a scene recording period. During the scene recording period TVS the sensor 1 integrates the light incident on the pick-up member P and originating from the scene 3 to be recorded to an accumulated charge. The commencement and the end of the light integration is denoted by instants t1 and t2, respectively. The scene recording period TVS is succeeded by a scene information transfer period TFV. The period TFV consists of two pairs for which instants t2, t3 and t4 are given. Between the instants t2 and t3 the sector FV (9.2°) of the disc shutter 5 of FIG. 4 is in the process of covering the pick-up member P. At the instant t3 the pick-up member P is entirely covered and the actual information transfer between the pick-up member P and the storage member M of the sensor 1 of FIG. 1 starts until the instant t4. This information transfer is effected in known manner under the control of the clock pulse signals S1, S2 and S3 which are then identical. The entire recording-storage transfer period TFV which as an example has a duration of sixteen line periods has the actual information transfer lasting eight line periods between the instants t3 and t4. During the previously occurring period of eight line periods between the instants t2 and t3 the actual information transfer is prepared. It is found that the optical path (7) during the period TFV is blocked partly, completely and partly again. This blocking prevents a so-called smear signal from being generated by the pick-up member P, which would be the case if there was a continuing light integration in the pick-up member P during the transfer period TFV = 16 L or during a part thereof. If it is accepted that a smear signal is generated and if it is compensated, for example, by a later electronic signal processing operation, this optical blocking can be dispensed with.

Figure 3:

At the instant t4 in the time diagram of FIG. 2 the storage member M has taken over all scene information in known manner from the pick-up member P of the sensor 1 of FIG. 1. FIG. 3 gives a survey as a function of time t of the information processing in the storage member M from the instant t4. In FIG. 3 the references L1, L2 etc. up to and including L294 denote the rows of memories L corresponding to television lines L having the same reference numerals. The stored scene information is denoted by VS1, VS2 etc. up to and including VS294. The instant t4 is assumed to be the instant of commencement when the first television line with the scene information VS1 is transferred from the storage member M to the parallel-in, series-out shift register member SR. This is effected in known manner in a line blanking period (12 µs) of the line period. The scene information components VS2 up to and including VS294 then reach the rows of memories L1 up to and including L293. Subsequently the memory row L294 does not comprise any information. The information is transferred from the storage member M to the register member SR under the control of the clock pulse signals S3 and S4. In the line period the line scan period (52 µs) follows in which the shift register member SR supplies the recorded scene information VS1 from the output terminal 2 under the control of the clock pulse signal S5.

In the subsequent line period the same happens so that the scene information VS2 becomes available at the terminal 2 while the scene information components VS3 up to and including VS294 are present in the memory rows L1 up to and including L292, whilst the memory rows L294 and L293 no longer contain any information. The information between the memory rows L is transferred at the line frequency which is equal to 15625 Hz. in the example given with reference to FIG. 2.

While the scene information VS1 up to and including VS294 of FIG. 3 is transferred from the instant t4 from the storage member M to the shift register member SR of FIG. 1, it follows from FIG. 2 that in the subsequent period TAS = 70 L the sector A of the shutter 5 is present in the optical path (7). From the instant t4 the sector A is present up to an instant t5. During the seventy line periods a light integration takes place in the pick-up member P of the sensor 1, which integration leads to the first focus information. After the recording period TAS a focus information transfer period TFA = 16 L occurs in accordance with the time diagram, whilst instants t6 and t7 occur which correspond to the instants t3 and t4 described with reference to the period TFV.

At the instant t6 with which the position shown in FIG. 4 of the disc shutter 5 relative to the pick-up member P is associated, the scene information VS79 up to and including VS294 is present in the storage member M according to FIG. 3, whilst the memory rows L217 to L294 no longer contain any information. According to one aspect of the invention the clock pulse frequency of the signal S1 during the recording-storage transfer period TFA is a factor of an integral number higher than one, for example, several tens higher than the clock pulse frequency of the signal S2 controlling the information transfer from the pick-up member P to the storage member M. Consequently an information addition is effected in the first row of storage elements in the pick-up member P or in the last row of storage elements in the storage member M, because once in as many times as the frequency factor information is transferred from the pick-up member P to the storage member M. A frequency factor of forty is mentioned as an example. Consequently the information of forty rows of storage elements reaches one row of storage elements. Starting from the line frequency of 15625 Hz. for the information transfer in the storage member M a transfer frequency of 625 kHz follows in the pick-up member P. The focus information originating from the 294 pick-up rows reaches eight memory rows for which there applies that $7 \times 40 + 1 \times 14 = 294$. These focus information components are denoted by AS1, AS2 to AS8 in FIG. 3. The focus information components AS1 to AS7 are added from forty pick-up rows, while the focus information AS8 originates from fourteen pick-up rows. FIG. 3 shows that seventy-eight memory rows without information occur at the instant t7 between the last scene information VS294 and the first focus information AS1.

The time diagram of FIG. 2 shows that the final instant t7 is the instant of commencement t1 of the next field period TV. In this field period TV the described operation is repeated, with the sector B instead of the sector A moving in front of the pick-up member P. The focus information transfer period TFB is shown with two instants t6' and t7' which correspond to the instants t6 and t7 of the period TFA. In FIG. 3 the instant t7' is further indicated and the presence of the focus information components BS1 to BS8 in the storage member M is associated therewith.

FIG. 2 whose that during the field periods TV the pick-up member P transfer information twice to the storage member M during recording-storage transfer periods TFV and TFA or TFB. Then there are two information recording periods TVS and TAS or TBS. For the choice made for TFV = TFA = TFB = 16 L and TAS = TBS = 70 L it follows that 210.5 line periods remain for the scene information recording period TVS. As compared with the known cameras for which there applies that TV = TVS + TFV it follows that 296.5 line periods remain for a scene recording period TVS at TFV = 16 L. This corresponds to an attenuation of the scene information generation by a factor of 210.5 divided by 296.5, which is equal to 0.71. The attenuation of 29% is acceptable for focusing purposes.

If the presence of signal smear is allowed, the interruption of the optical path (7) during the two periods TFA and TFB may be dispensed with. It is then assumed that the two signal smears correlate.

From the instant t4 the scene information VS is transferred during substantially 294 line periods from the storage member M of the shift register member SR. In FIG. 3 the reference t(VS294) denotes the instant when there is just no longer any scene information VS in the storage member M. The focus information AS or BS is then present in the memory rows L79 to L86, whilst the remaining memory rows L do not contain any information. The instant t(VS294) is $294 + 8 = 302$ line periods before the instant t3 when the storage member M is going to be filled with the subsequent scene information VS in the next field period during the period t3 to t4. It is found that a period of 10.5 line periods is available for transferring the focus information AS and BS from the storage member M. This period of 10.5 line periods amply falls within the standard field blanking period of 8% of the field period, which comprises 25 line periods in the given example. It is found that the sensor 1 supplies scene information VS to the terminal 16 during 294 line periods so that the field scan period of 287.5 line periods is exceeded by 6.5 line periods, which is common practice. According to the television standard the field scan period starts at the instant t4 preceded by the field blanking period of 25 line periods.

As has been stated, there are 10.5 line periods (0.672 ms) available in the field blanking period so as to process the focus information AS or BS occurring in the memory rows L79 to L86. For this processing operation it is assumed that the shift register member SR operates in the normal manner with the information supply in the line scan period of 52 μs so that eight line periods are required for that purpose. The transfer to the shift register member SR from the storage member M may be effected in the period of 12 μs (the line blanking period) or in the period of 1.6 μs when the clock pulse signal having the frequency of 625 kHz is used. It is found that there are 2.5 line periods available to transport the information AS or BS from the memory rows L79 to L86 to the memory rows L1 to L8. This transport is effected in 78 steps of 1.6 μs which covers 124.8 μs. This period lies amply within the period of 2.5 line periods, equal to 60 μs. After the transport in the storage member M the transfer to the shift register member SR takes place once per line blanking period of 12 μs during eight line periods. The change-over device 12 is in the state shown in FIG. 1 during the eight line periods, whilst the change-over device 19 is in the state shown when the focus information AS is passed on. In the next field period the change-over device 19 is in the state not shown.

The embodiment of the sensor 1 in the form of a frame transport device described in greater detail hereinbefore and being active with the information transfer in the column direction of the pick-up elements in the pick-up member P provides the information addition possibility in the first row of pick-up elements or the last row of storage elements due to the free choice of the said clock pulse frequency factor (for example, equal to 40). In the case described with the subjected storage member M without a transfer possibility in the column direction of the pick-up elements in the superjacent pick-up member P there is no such addition possibility. In this case focus information generations over 86 line periods can be used after the instant t4 of FIG. 2. At the end of the 86 line periods the information of, for example, the last 8 pick-up element rows is simultaneously transferred to the subjacent associated memory rows. A reset to the integration point of commencement is to be effected for the remaining pick-up element rows. The foregoing likewise applies to the interline transfer device described.

A ratio of approximately 3:1 follows from the numbers of line periods of 210.5 and 70 for the information integration periods given in the time diagram of FIG. 2. If there is no information addition, but a signal integration over, for example, ten field periods in the signal comparator 21 of FIG. 1 with the square root therefrom, an improvement of the signal-to-noise ratio of 3.16 is obtained. The quality of the focus information is then approximately the same as that for the scene information. The described information addition similarly implies an improvement of the signal-to-noise ratio, but due to the combination of the focus information over the number of adjacent television lines this information occurs, as it were, vaguely in the signals AS and BS. Dependent on the contents of the scene 3 a focus setting either or not with the information addition at the television lines or the information integration over the field periods may be chosen. Without an information addition the focus information components AS and BS of FIG. 3 are associated with eight television lines which occur adjacent to each other or are spread in the television picture. The time diagram of FIG. 2 may be associated with this. A reduction of the focus information integration periods TAS and TBS can be performed by using the information addition. This reduction may proceed so far that it becomes possible to perform the entire focus information generation per field period. The camera is then successively operative with the periods TVS, TFV, TAS, TFA, TBS and TFB during one television field period.

In an embodiment of the camera according to FIG. 1 with several sensors as are sometimes used in colour television it is sufficient to utilize one of the sensors for the focus information generation.

The described focus-setting which is based on the two optical paths having the different path lengths may be combined with one of the known focus-setting modes based on a distance measurement in the infrared or ultraviolet radiation area. Instead of the disc construction of the shutter 5 shown in FIG. 4 a rotatable cylinder construction may be used in which the sensor 1 is present. The cylindrical shutter similarly has the light-transmissive shutter areas with the described shutter thicknesses and the opaque shutter areas.

Instead of the use of the shutter 5 with the different shutter thicknesses a periodical displacement of the sensor 1 is feasible for sequentially obtaining the first (shortest A) and second (longest B) optical paths for obtaining the focus information relative to the average optical path length in the scene recording.

What is claimed is:

1. A camera for recording television, photographic or cinematographic images, including an automatic focus-setting device, in which camera an image of a scene to be picked-up is obtained via an optical lens system of an opto-electronic sensor in the form of a charge transfer device suitable for television comprising a pick-up member, an information storage member and a parallel-in, series-out shift register member connected to a sensor output terminal, said camera operating for the automatic focus-setting with first and second optical paths of different path lengths in the optical lens system, said camera including a signal comparator for comparing signals to be supplied by the sensor from the output terminal, which signals are associated with the presence of the first and second optical paths of different path lengths, the focus-setting device adjusting the focus setting in a manner dependent on a comparison of the scene image contrast between the first and second optical paths, characterized in that during a television field period the camera is consecutively operative with a scene recording period, a scene information transfer period for the transfer of information between the pick-up member and the storage member, at least one focus information recording period in which the first or second optical paths, respectively, are present in the optical lens system, and a focus information transfer period for the transfer of information between the pick-up member and the storage member.

2. A camera as claimed in claim 1, characterized in that during a television field period the camera is consecutively operative with a scene recording period, a scene information transfer period for the transfer of information between the pick-up member and the storage member, a first focus information recording period in which the first optical path is present in the optical lens system, a first focus information transfer period for the transfer of information between the pick-up member and the storage member, a second focus information recording period in which the second optical path is present in the optical lens system and a second focus information transfer period for the transfer of information between the pick-up member and the storage member.

3. A camera as claimed in claim 1 characterized in that in the camera having a time signal generator for applying distinct clock pulses to various outputs for the information transfer in and between the parts of the sensor the pick-up member and the storage member are coupled to distinct clock pulse outputs during the focus information transfer period, the frequency of the clock pulses for the information transfer in the pick-up member being a factor of an integer of more than one higher than that in the storage member, and the information between the pick-up member and the storage member being transferred under the control of the clock pulses for the information transfer in the storage member.

4. A camera as claimed in claim 1, characterized in that the sensor output terminal is coupled to an input of a change-over device having a first and a second output, the first output being coupled to a signal terminal of the camera and the second output being coupled to an input of the signal comparator in the camera, the first and second outputs in the change-over device being connected to the input during television field scan periods and substantially during field blanking periods, respectively.

5. A camera as claimed in claim 1 in which a shutter rotatable about a shaft forms part of the optical lens system, which shutter provides the first and second optical paths of different path lengths in the system, characterized in that the shutter which is rotatable in front of the entire pick-up member of the sensor is formed with light-transmissive shutter areas with a shutter thicknesses present in front of the pick-up member during the scene recording periods which thickness is smaller and larger than the shutter thickness present in front of the pick-up member during two consecutive focus information recording periods.

6. A camera as claimed in claim 5, characterized in that the shutter has shutter areas which are opaque and are present in front of the pick-up member during at least the focus information transfer periods.

* * * * *